(12) United States Patent
Gandhi et al.

(10) Patent No.: US 10,232,814 B2
(45) Date of Patent: Mar. 19, 2019

(54) INFLATABLE VEHICLE OCCUPANT POSITIONING SYSTEM

(71) Applicant: Toyota Motor Engineering & Manufacturing North America, Inc., Erlanger, KY (US)

(72) Inventors: Umesh N. Gandhi, Farmington Hills, MI (US); Danil V. Prokhorov, Canton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 15/440,042

(22) Filed: Feb. 23, 2017

(65) Prior Publication Data

US 2018/0201213 A1 Jul. 19, 2018

Related U.S. Application Data

(60) Provisional application No. 62/447,705, filed on Jan. 18, 2017.

(51) Int. Cl.
| | |
|---|---|
| *B60R 21/0134* | (2006.01) |
| *B60R 21/015* | (2006.01) |
| *B60N 2/02* | (2006.01) |
| *B60R 21/207* | (2006.01) |
| *B60R 21/01* | (2006.01) |
| *B60R 21/013* | (2006.01) |

(52) U.S. Cl.
CPC ........ *B60R 21/0134* (2013.01); *B60N 2/0276* (2013.01); *B60R 21/015* (2013.01); *B60R 21/207* (2013.01); *B60R 2021/0102* (2013.01); *B60R 2021/01211* (2013.01); *B60R 2021/01315* (2013.01)

(58) Field of Classification Search
USPC ....... 701/45, 36, 49; 280/735, 734, 740, 753
See application file for complete search history.

(56) References Cited

U.S. PATENT DOCUMENTS

| | | | | |
|---|---|---|---|---|
| 5,707,109 A * | 1/1998 | Massara | ................. | B60N 2/914 |
| | | | | 297/284.9 |
| 6,042,145 A * | 3/2000 | Mitschelen | .......... | B60N 2/0232 |
| | | | | 280/735 |
| 6,129,419 A * | 10/2000 | Neale | .................... | B60N 2/4415 |
| | | | | 297/284.4 |
| 6,203,105 B1 * | 3/2001 | Rhodes, Jr. | ............... | A47C 4/54 |
| | | | | 297/284.6 |
| 6,755,273 B2 * | 6/2004 | Breed | .................... | B60N 2/002 |
| | | | | 180/274 |
| 7,322,652 B1 * | 1/2008 | Tache | ................... | B60N 2/0224 |
| | | | | 297/284.9 |
| 9,688,163 B2 * | 6/2017 | Hotary | ................... | B60N 2/809 |
| 9,827,888 B2 * | 11/2017 | Patrick | ................ | B60N 2/0244 |

(Continued)

FOREIGN PATENT DOCUMENTS

| | | |
|---|---|---|
| KR | 101327466 B1 | 11/2013 |
| WO | 2013154560 A1 | 10/2013 |

*Primary Examiner* — Richard A Goldman (74) *Attorney, Agent, or Firm* — Christopher G. Darrow; Darrow Mustafa PC (57) ABSTRACT

A vehicle occupant positioning system includes at least one inflatable bladder structured and positioned so as to urge a portion of the body of the vehicle occupant in a predetermined direction when the bladder is inflated.

12 Claims, 8 Drawing Sheets

(56) References Cited

U.S. PATENT DOCUMENTS

| | | | |
|---|---|---|---|
| 2002/0166710 A1* | 11/2002 | Breed | B60N 2/002 180/282 |
| 2005/0029781 A1 | 2/2005 | Enders et al. | |
| 2006/0041359 A1* | 2/2006 | Ohtsubo | B60N 2/0252 701/45 |
| 2006/0196715 A1* | 9/2006 | Fujishiro | B60N 2/0276 180/271 |
| 2006/0253241 A1* | 11/2006 | Bothe | B60N 2/002 701/49 |
| 2007/0200405 A1* | 8/2007 | Rager | B60N 2/7005 297/254 |
| 2007/0228703 A1* | 10/2007 | Breed | B60N 2/0232 280/735 |
| 2008/0162002 A1* | 7/2008 | Bacher | B60N 2/0232 701/45 |
| 2008/0246318 A1* | 10/2008 | Bothe | B60N 2/0252 297/217.3 |
| 2009/0072596 A1* | 3/2009 | Rogers | B60N 2/4242 297/216.17 |
| 2010/0283229 A1* | 11/2010 | Feller | B60N 2/99 280/728.2 |
| 2010/0283299 A1* | 11/2010 | Onuma | B60N 2/002 297/337 |
| 2011/0140487 A1* | 6/2011 | Omori | B60N 2/4885 297/216.12 |
| 2011/0148157 A1* | 6/2011 | Braun-Fischer | B60N 2/4228 297/216.13 |
| 2011/0266849 A1* | 11/2011 | Schwarze | B60N 2/0232 297/284.1 |
| 2012/0089303 A1* | 4/2012 | Freienstein | B60N 2/0276 701/45 |
| 2012/0109468 A1* | 5/2012 | Baumann | B60R 21/207 701/45 |
| 2012/0235459 A1* | 9/2012 | Yetukuri | B60N 2/002 297/391 |
| 2014/0291523 A1* | 10/2014 | Kwon | B60N 2/002 250/341.7 |
| 2014/0336880 A1* | 11/2014 | Freienstein | B60R 21/0132 701/45 |
| 2015/0012186 A1* | 1/2015 | Horseman | B60W 40/08 701/49 |
| 2015/0165947 A1* | 6/2015 | Clauser | B60N 2/5825 297/452.18 |
| 2015/0165996 A1* | 6/2015 | Harda | B60R 21/0132 701/45 |
| 2015/0203003 A1* | 7/2015 | Neyrinck | B60N 2/4235 297/284.9 |
| 2015/0352990 A1* | 12/2015 | Zouzal | A47C 4/54 297/284.3 |
| 2016/0063315 A1* | 3/2016 | Lim | G06K 9/00221 701/36 |
| 2016/0347271 A1* | 12/2016 | Kuehne | B60N 2/0244 |
| 2017/0050542 A1* | 2/2017 | Shigeta | B60K 35/00 |
| 2017/0282770 A1* | 10/2017 | Hotary | B60N 2/665 |
| 2018/0022235 A1* | 1/2018 | Sugiyama | B60N 2/0244 297/284.9 |
| 2018/0201213 A1* | 7/2018 | Gandhi | B60R 21/0134 |

\* cited by examiner

INFLATABLE VEHICLE OCCUPANT POSITIONING SYSTEM

CROSS REFERENCE TO RELATED APPLICATIONS

This application claims benefit of U.S. Provisional Application No. 62/447,705, filed on Jan. 18, 2017, which is herein incorporated by reference in its entirety.

TECHNICAL FIELD

The present invention vehicle occupant protection systems and, more particularly, to a system for repositioning a vehicle occupant prior to deployment of a vehicle airbag.

BACKGROUND

The introduction of autonomous or self-driving vehicles may free vehicle occupants from driving tasks, and may permit the occupant greater freedom to change positions and/or orientation within a seat and within the vehicle. For example, the driver (or passenger) may be leaning to one side within a seat, or the seat may be reclined to a sleeping position for the occupant. However, many vehicle occupant protection systems may be designed primarily to help restrain or cushion an occupant when the occupant is positioned in a predetermined location or has a predetermined orientation (for example, facing toward the front) within the vehicle. Such occupant protection systems may be less effective if the occupant's position and/or orientation deviate from the predetermined coverage parameters of the protection system.

SUMMARY

In one aspect of the embodiments described herein, a vehicle occupant positioning system is provided. The system includes at least one inflatable bladder structured and positioned so as to urge a portion of the body of the vehicle occupant in a predetermined direction when the bladder is inflated.

In another aspect of the embodiments described herein, a vehicle seat is provided. The seat includes at least one inflatable bladder structured and positioned so as to urge a portion of a body of an occupant of the seat in a predetermined direction when the at least one bladder is inflated.

DETAILED DESCRIPTION

Embodiments described herein relate to a vehicle occupant positioning system. The occupant positioning system includes at least one inflatable bladder structured and positioned so as to urge a portion of the body of the vehicle occupant in a predetermined direction when the at least one bladder is inflated. The at least one bladder may be located within a seat bottom or a seat back of a vehicle seat. Activation of one or more inflatable bladders prior to deployment of an associated airbag may aid in moving an out-of-position seat occupant into a better position and/or orientation for deployment of the airbag.

Figure 1:
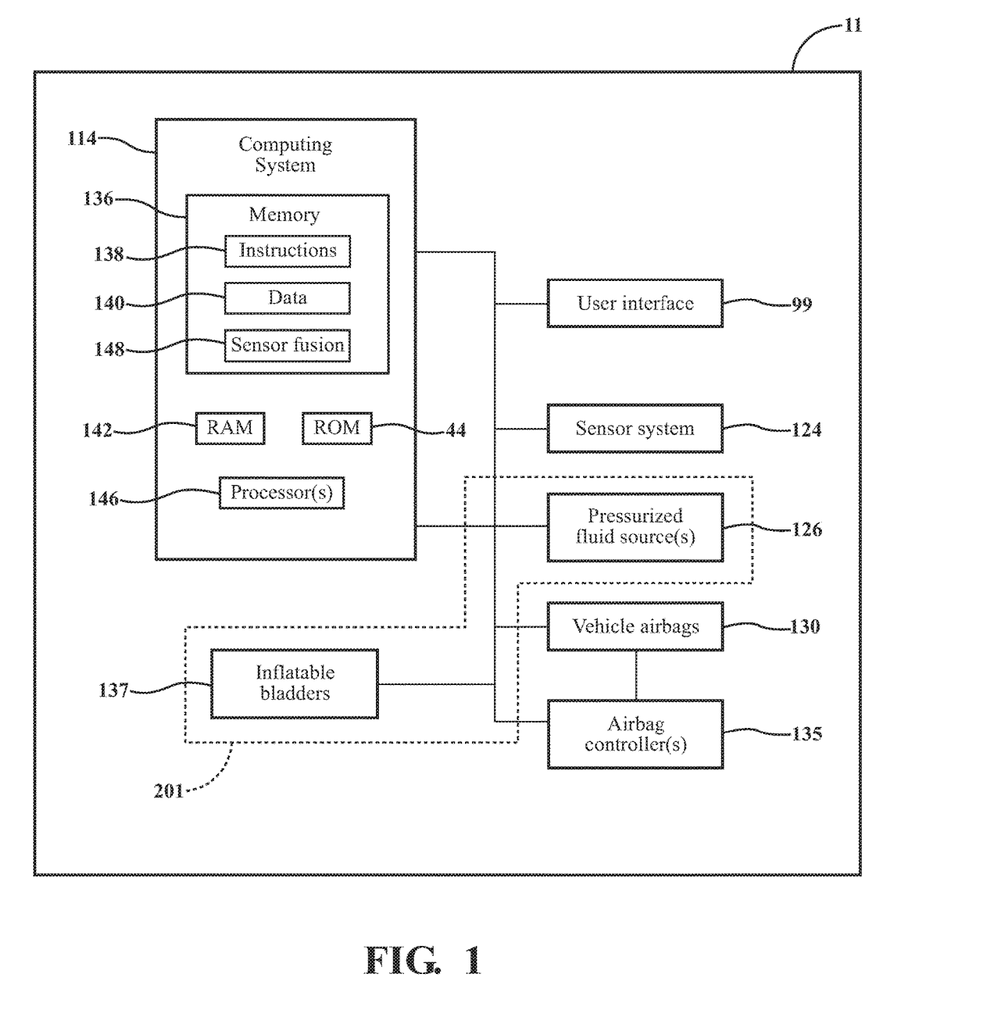
FIG. 1 is a functional block diagram illustrating a vehicle incorporating an inflatable occupant positioning system in accordance with an example embodiment.

FIG. 1 is a functional block diagram illustrating an exemplary vehicle 11 incorporating an inflatable vehicle occupant positioning system 201 in accordance with an embodiment described herein. The vehicle 11 may take the form of a car, truck, or other vehicle. The vehicle 11 may be configured to operate fully or partially in an autonomous mode. In an autonomous mode, the vehicle 11 may be configured to operate without human interaction. For example, elements of the vehicle occupant positioning system described herein may be automatically operated by a controller or computing system.

The vehicle 11 may include various systems, subsystems and components in operative communication with each other, such as a sensor system or array 124, a computing system 114, the inflatable vehicle occupant positioning system 201, and other systems and components needed for operating the vehicle as described herein. The vehicle 11 may include more or fewer systems and each system could include multiple elements. Further, each of the systems and elements of vehicle 11 may be interconnected. Thus, one or more of the described functions of the vehicle 11 may be divided up into additional functional or physical components or combined into fewer functional or physical components. In some further examples, additional functional and physical components may be added to the examples illustrated by FIG. 1.

The computing system 114 may be operatively connected to the other vehicle systems and elements and may be configured so as to control and operate the vehicle 11 and its components as described herein. The computing system 114 may be configured to control at least some systems and/or components autonomously or automatically (without user input) and/or semi-autonomously (with some degree of user input). The computing system 114 may also be configured to control and/or execute certain functions autonomously and/or semi-autonomously. The computing system 114 may additionally or alternatively include components other than those shown and described.

The computing system 114 may control the functioning of the vehicle 11 based on inputs and/or information received from various sensors of the sensor system 124. FIG. 1 illustrates a block diagram of an exemplary computing system according to one or more illustrative embodiments of the disclosure. The computing system 114 may have some or all of the elements shown in FIG. 1. In addition, the computing system 114 may also include additional components as needed or desired for particular applications. The computing system 114 may also represent or be embodied in a plurality of controllers or computing devices that may process information and/or serve to control individual components or systems of the vehicle 11 in a distributed fashion.

The computing system 114 may include one or more processors 146 (which could include at least one microprocessor) for controlling overall operation of the computing system 114 and associated components, and which execute instructions stored in a non-transitory computer readable medium, such as the memory 136. "Processor" means any component or group of components that are configured to execute any of the processes and/or process steps described herein or any form of instructions to carry out such processes/process steps or cause such processes/process steps to be performed. The processor(s) 146 may be implemented with one or more general-purpose and/or one or more special-purpose processors. The processor(s) 146 can include at least one hardware circuit (e.g., an integrated circuit) configured to carry out instructions contained in program code. In arrangements in which there is a plurality of processors 146, such processors can work independently from each other or one or more processors can work in combination with each other. In one or more arrangements, the processor(s) 146 can be a main processor of the vehicle 11. For instance, the processor(s) 146 can be part of a vehicle electronic control unit (ECU).

In some embodiments, the computing system 114 may include RAM 142, ROM 44, and/or any other suitable form of computer-readable memory. The memory 136 may comprise one or more computer-readable memories. A computer-readable storage or memory 136 includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. The memory 136 can be a component of the computing system 114, or the memory can be operatively connected to the computing system 114 for use thereby. The term "operatively connected," as used throughout this description, can include direct or indirect connections, including connections without direct physical contact.

The memory 136 may contain data 140 and/or instructions 138 (e.g., program logic) executable by the processor(s) 146 to execute various functions of the vehicle 11. The memory 136 may contain additional instructions as well, including instructions to transmit data to, receive data from, interact with, or control one or more of the vehicle systems and/or components described herein (for example, inflatable vehicle occupant positioning system 201).

Vehicle sensor system 124 may be in operative communication with computing system 114 and other vehicle systems and components. In a known manner, the sensor system 124 includes sensors configured to provide data usable by the computing system 114 in formulating and executing suitable control commands for the various vehicle systems. In arrangements in which the sensor system 124 includes a plurality of sensors, the sensors can work independently from each other. Alternatively, two or more of the sensors can work in combination with each other.

Figure 7:
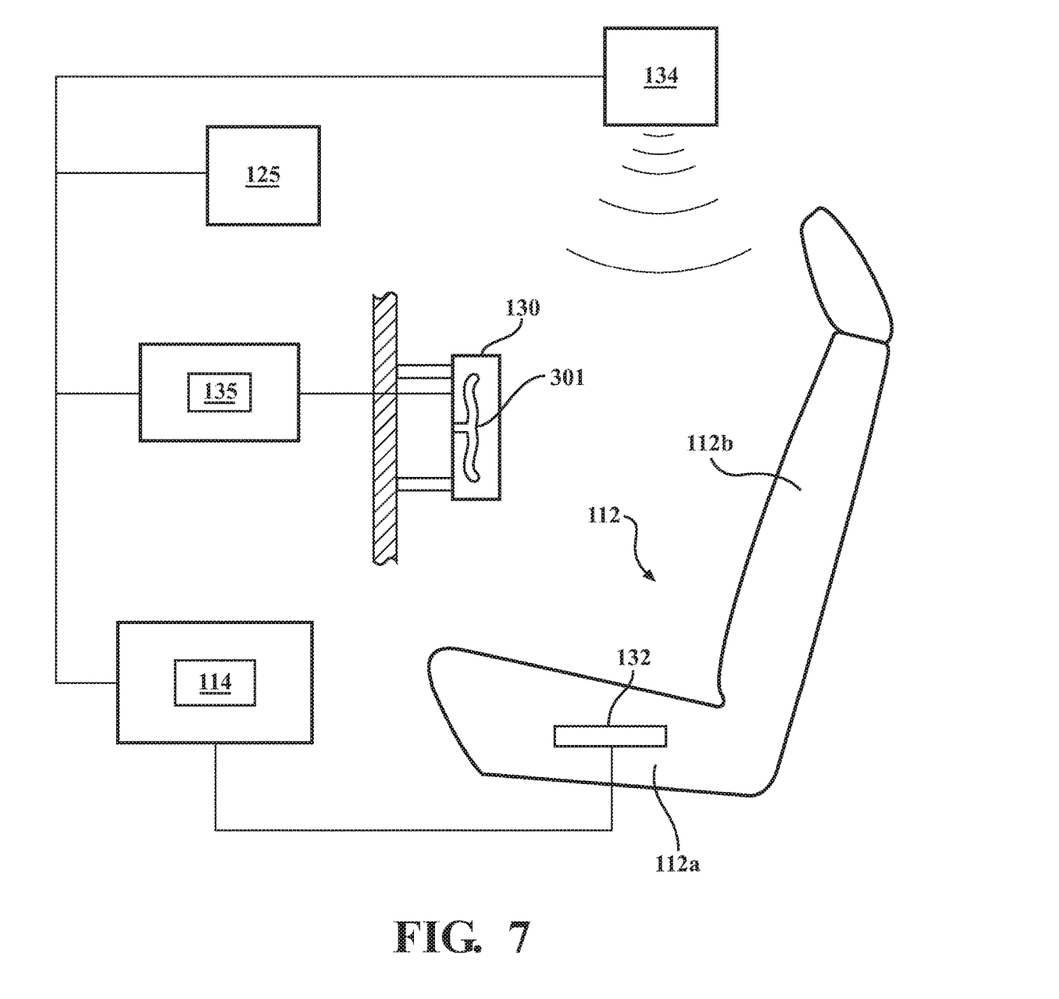
FIG. 7 is a schematic block diagram showing one embodiment of a sensor arrangement configured for measuring one or more vehicle occupant parameters.

Referring to FIG. 7, sensor system 124 may include one or more sensors operable to obtain data which may be used (by the pertinent sensors and/or in conjunction with computing system 114) to determine values for various vehicle occupant parameters relating to an occupant of the vehicle. The values of these parameters may be used to control operation of the various inflatable bladders described herein. The vehicle occupant parameters may include occupant weight, height, locations (and/or relative locations) of the occupant's head, torso, or other body portion, a direction in which the occupant is leaning, and other parameters. Because these parameters may change unpredictably and relatively rapidly, the sensors 124 and the computing system 114 may continuously gather and process data relating to the parameters, so that the vehicle occupant parameter values may be updated as rapidly as possible.

The use of "continuously" when referring to the reception, gathering, monitoring, processing, and/or determination of any information or parameters described herein means that the computing system 114 may be configured to receive and/or process any information relating to these parameters as soon as the information exists or is detected, or as soon as possible in accordance with sensor acquisition and processor processing cycles.

Types of sensors used may include weight (e.g., pressure) sensors (such as seat-mounted weight sensor 132), body portion positional sensors, and sensors for measuring other characteristics or conditions. Vehicle occupant parameters determined using the sensor data may be provided to the computing system 114 or to a controller controlling the pressurized fluid source(s) 126, for using in generating control signals for operation of the pressurized fluid source(s).

As an example, referring to FIG. 7, the vehicle 11 may incorporate one or more body portion positional sensors 134. The body portion positional sensor 134 may be disposed in the roof of the vehicle or in another suitable location. This sensor may be, for example, an ultrasonic sensor, and may measure a position of the occupant's head with respect to the sensor, and may also measure a direction of the occupant's head with respect to the sensor. The sensor may alternatively gather data from which these parameters may be determined. The body portion positional sensor 134 may send a signal to the computing system 114 containing the gathered information or any parameter value determined. In other embodiments, the body portion positional sensor 134 may be a capacitive or laser sensor. Those skilled in the art may recognize that additional types of sensors may also be used, either alone or in combination with other sensors. In addition, the computing system 114 may use information received from any combination of sensors in sensor system 124 and also information from any other source in determining the values of the Vehicle occupant parameters.

In another example, one or more cameras (generally designated 125) may be mounted in the passenger compartment. The cameras may be configured for detecting (or for providing information usable by the computing system 114 for determining) the position of an occupant (or the position of a particular portion of the body of an occupant) within the passenger compartment, an occupant orientation (for example, whether the occupant and/or the occupant's seat is facing to the right or left, or whether the occupant is reclined or seated upright in the seat), the occupant's height, and other parameters. For example, the cameras(s) (and/or other sensors) may provide information enabling detection of a condition in which an occupant's head resides outside a predetermined zone or volume in relation to the seat. Examples of such a zone are zone Z1 shown in FIGS. 3A-3C (bounded by parallel phantom lines) and zone Z2 shown in FIGS. 4A-4C. A volume defined by Z2 may be the same as the volume defined by Z1. In one or more arrangements, such a zone may be an optimal deployment zone for an associated vehicle airbag. The computing system 114 may be configured to control inflation of one or more inflatable seat bladders based on whether the occupant's head resides within the predetermined zone.

The cameras may also be configured to provide information (relating, for example, to the relative positions of the head and torso of the occupant) from which an orientation of the occupant may be estimated. For example, the camera data may be usable to determine in which direction the occupant is leaning while seated in the seat. Those skilled in the art may recognize that many different types and combinations of sensors may be used to estimate the occupant's weight, height, orientation or other vehicle occupant parameters.

Sensor system 124 may also include one or more pre-collision or pre-crash sensors configured to alert the computing system to vehicle external conditions which indicate that a collision is imminent or probable. The pre-collision sensor(s) may include radar-based sensors, laser-based sensors, cameras, or any other suitable sensors. The computing system 114 may be configured to operate a pressurized fluid source to inflate at least one bladder responsive to a signal received from a pre-collision sensor.

In certain embodiments, one or of sensors 124 may incorporate a level of data processing capability as well as data gathering capability. This may enable the sensor to process data gathered by the sensor to detect or determine, for example, a particular value of a vehicle occupant parameter. In cases where the parameter value may represent a trigger condition for inflation of one or more inflatable bladders, the detection or determination of the condition may be passed to the computing system 114 or to a controller. The computing system or controller may then generate and transmit a suitable command for inflation of the one or more inflatable bladders. In other embodiments, a sensor may gather data and pass the data to the computing system 114 or to a controller for analysis and interpretation.

The vehicle 11 may include various types of airbags, generally designated 130 configured for vehicle occupant protection. These airbags (for example, driver front airbag 301 as shown in the drawings) may be positioned at any of a variety of locations within the vehicle, and may include front airbags, side curtain airbags, and any other desired type of airbag.

The vehicle may include one or more airbag controllers 135 in operatively connected to airbags 130, computing system 114, sensor system 124, and other elements of the vehicle as required. Airbag controller(s) 135 may be configured to control operation of the various vehicle airbags responsive to information received from the sensor system 124, computing system 114, and other sources. In one or more arrangements, the airbag controller(s) 135 or their functions may be incorporated into computing system 114.

Embodiments of an inflatable vehicle occupant positioning system described herein may be designed to position a vehicle occupant who is determined to be out-of-position or outside an optimal zone for deployment of an airbag designed to cushion the occupant in the event of a collision. In one or more arrangements, when a collision event necessitating deployment of a vehicle airbag is determined to be imminent, and a portion of the occupant is determined to be outside an optimal deployment zone for deployment of the airbag, one or more elements of the inflatable occupant positioning system may be activated to urge the portion of the occupant toward a location within the optimal deployment zone.

In one or more arrangements, the inflatable occupant positioning system 201 may include one or more inflatable bladders (generally designated 137) positioned so as to urge an associated portion of a body of a vehicle occupant toward a location within an optimal airbag deployment zone when the bladder(s) are inflated. The system 201 may also include one or more associated pressurized fluid source(s) (generally designated 126) configured to supply inflation fluid to each inflatable bladder of the occupant positioning system 201. The system 201 may also include additional systems or elements as needed for performing the system functions described herein.

Referring to FIGS. 2A-5C, one or more inflatable bladders may be positioned in a vehicle seat. The bladders may be structured to follow or be recessed from the contours and surfaces of the vehicle seat in its normal usage configuration. For example, as seen in FIGS. 2A-4C, bladders may be positioned within a bottom 112a of the seat 112.

Each inflatable bladder described herein may be in operative communication with one or more associated pressurized fluid source(s) (generally designated 126). Fluid source(s) 126 may also be in operative communication with computing system 114 or with a suitable controller configured to operate the fluid source(s) responsive to occupant position, orientation, and/or other vehicle occupant parameters as described herein. Fluid source(s) 126 may be operable to supply inflation fluid to each individual inflatable bladder responsive to control signals from computing system 114. Fluid source(s) 126 may be in any of a variety of forms. In one or more arrangements, one or more fluid source(s) 126 may be in the form of a pressurized fluid reservoir which is pressurized as needed by a compressor (not shown), and which may store compressed air for use in inflating the bladders. The fluid source(s) may also have alternative forms. In one or more arrangements, the computing system 114 may be configured to function as the fluid source controller. Fluid source(s) 126 may include any fluid control valves (not shown) needed to control pressurized fluid flow as described herein. The fluid control valves may be configured to be controllable by signals from computing system 114.

Figure 2A:
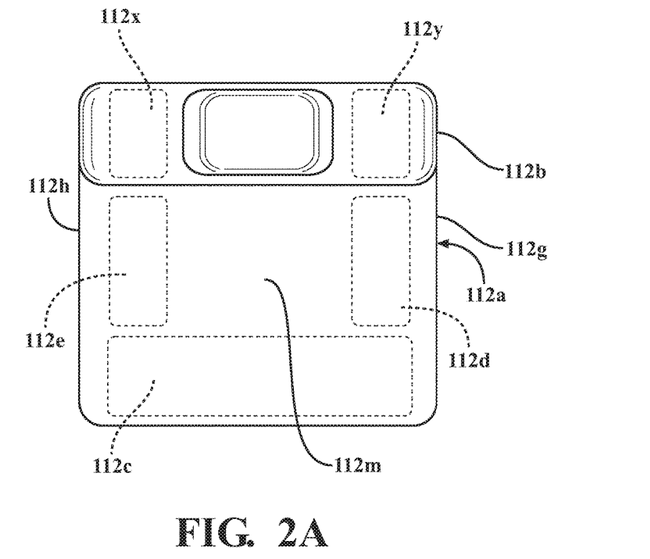
FIG. 2A is a schematic plan view of an embodiment of a vehicle seat which incorporates therein several inflatable bladders of an inflatable occupant positioning system.
Figure 2B:
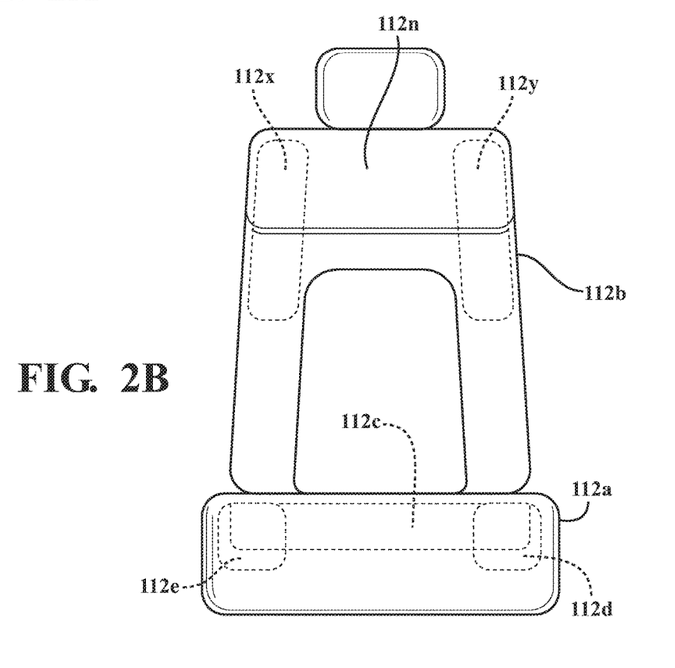
FIG. 2B is a schematic frontal view of the seat shown in FIG. 2A.

FIG. 2A is a schematic plan view of an embodiment of a vehicle seat 112 which incorporates therein several inflatable bladders 112c-112e and 112x, 112y. Each of the bladders 112c-112e and 112x, 112y may be structured and positioned so as to urge at least one portion of a body of an occupant of the seat in a predetermined direction when the bladder is inflated. FIG. 2B is a schematic frontal view of the seat 112 shown in FIG. 2A. Bladders 112c-112e may be located in seat bottom 112a. Inflatable bladders 112x and 112y may be positioned within and along respective first and second side portions of the seat back 112b. In the embodiment shown, bladder 112x may be positioned along a right side of seat back 112b (from the perspective of a seated occupant 32) and bladder 112y may be positioned along a left side of seat back 112b opposite the bladder 112x.

An inflatable bladder may be structured and positioned so as to urge one or more knees of a seated occupant in an upward direction when the at least one bladder is inflated. For example, a bladder 112c may be positioned in bottom 112a toward a front-most portion of the seat bottom. The bladder 112c may be structured to press upwardly on the knees of the occupant when the bladder is inflated.

Figures 3A, 3B:
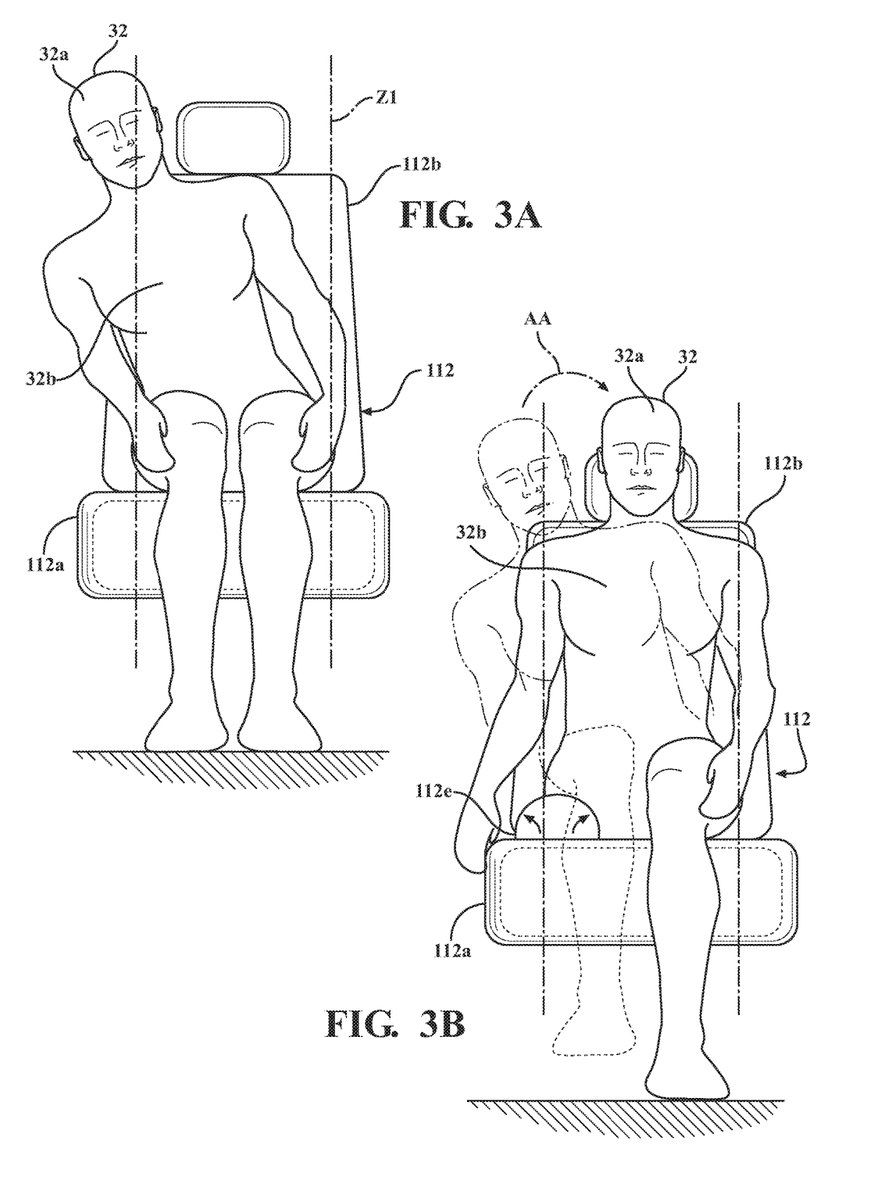
FIG. 3A is a schematic frontal view of a seated out-of-position occupant in a seat as shown in FIGS. 2A-2B, prior to activation of the inflatable occupant positioning system.
FIG. 3B is the frontal view of FIG. 3A showing inflation of an inflatable bladder of the inflatable occupant positioning system to urge an out-of-position head and torso of the occupant into a position for subsequent deployment of an associated airbag.
Figures 3C, 4A:
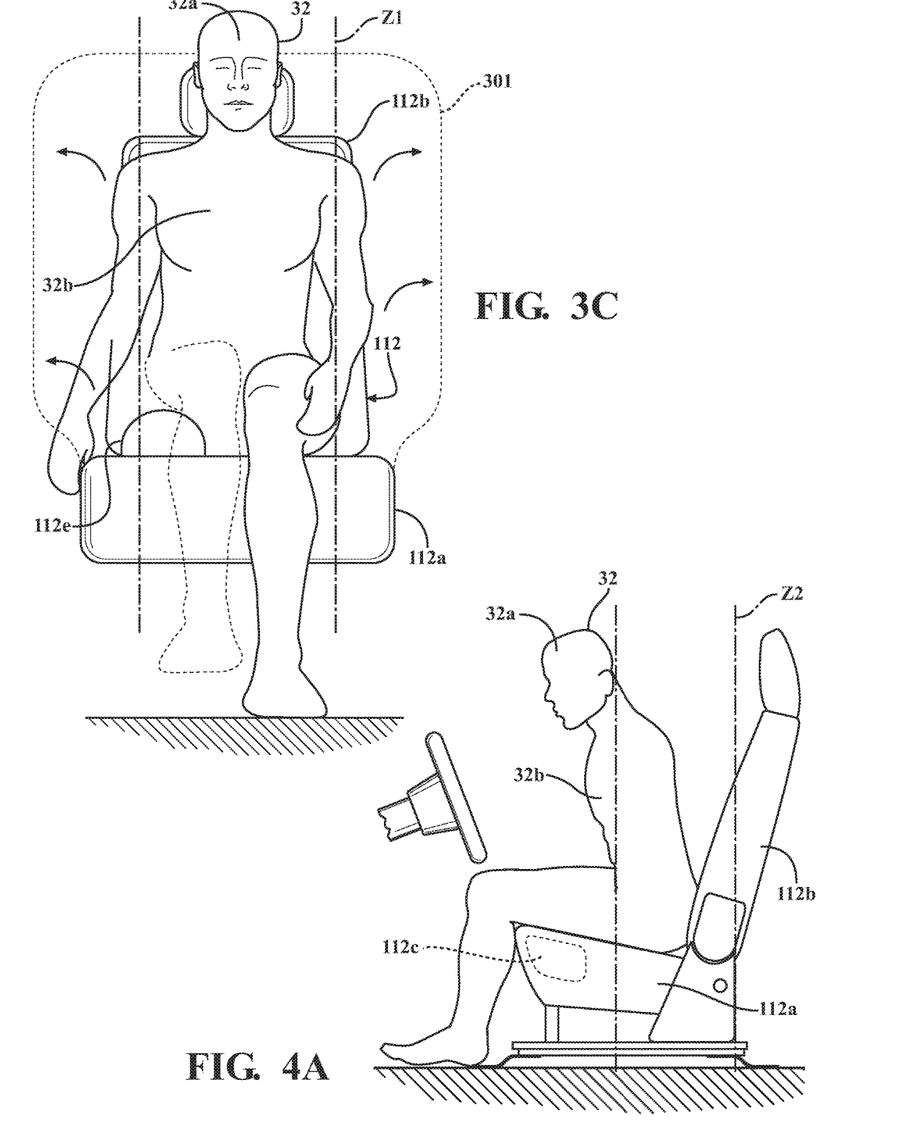
FIG. 3C is the schematic view of FIG. 3B showing the occupant's head and torso repositioned to an optimal location for deployment of the airbag.
FIG. 4A is a schematic side view of a seated out-of-position occupant in a seat as shown in FIGS. 2A-2B, prior to activation of the inflatable occupant positioning system.

In addition, an inflatable bladder may be positioned along one or more side portions of the seat bottom. In the embodiment of FIGS. 2A-2B, a first inflatable seat bottom bladder 112d is positioned along a first side portion 112g of the seat bottom, and a second inflatable seat bottom bladder 112e is positioned along a second side portion 112h of the seat bottom opposite the first side portion. In the embodiment shown, the first side portion 112g is a left side portion of the seat bottom, and the second side portion 112h is a right side portion of the seat bottom. The bladders 112d and 112e may be structured and positioned so as to press upwardly on an upper thigh portion of an associated left or right leg of the occupant when inflated, as shown in FIGS. 3A-3C.

Figure 5A:
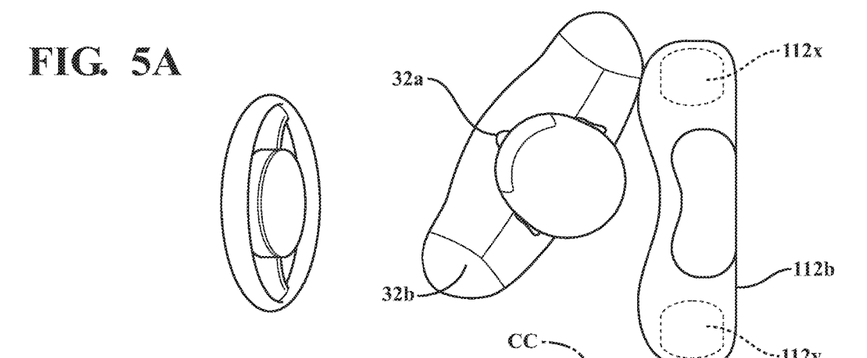
FIG. 5A is a schematic plan view of a side-facing occupant seated in a seat as shown in FIGS. 2A-2B, prior to activation of the inflatable occupant positioning system.
Figure 5B:
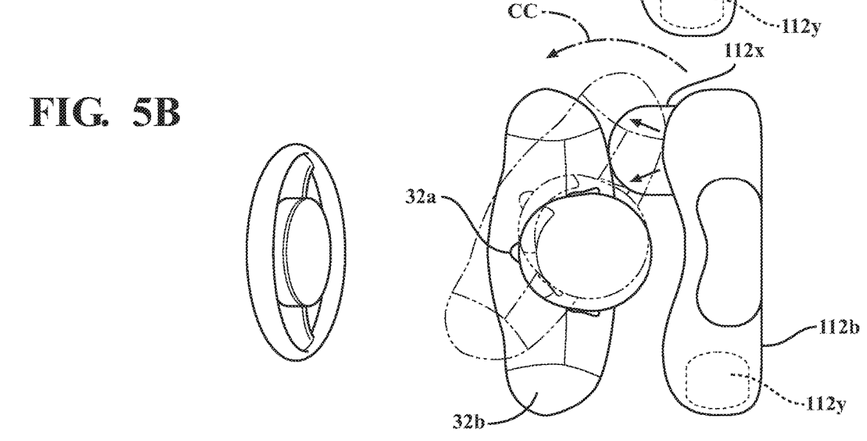
FIG. 5B is the schematic plan view of FIG. 5A showing inflation of an inflatable bladder of the inflatable occupant positioning system so as to contact the occupant's shoulder or shoulder blade and rotate the torso, prior to deployment of the airbag.
Figure 5C:
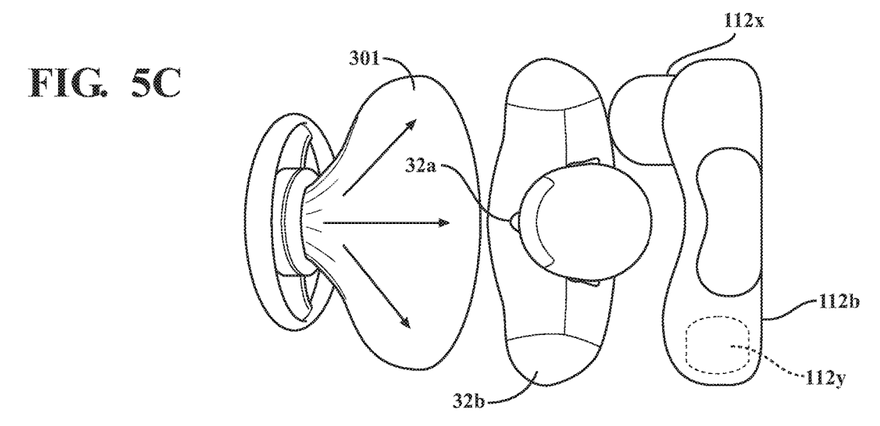
FIG. 5C is the schematic plan view of FIG. 5B showing the occupant rotated by the inflatable bladder into a forward-facing orientation for deployment of the airbag.

Each of bladders 112x and 112y may be structured and positioned so as to urge a torso of the occupant to rotate in a respective predetermined direction when the bladders are inflated. For example, right side seat back bladder 112x may be positioned and structured to contact a portion of an occupant's torso (such as a right shoulder blade) to urge the torso to rotate toward the occupant's left side as shown in FIGS. 5A-5C. Similarly, left side seat back bladder 112y may be positioned and structured to contact a portion of an occupant's torso (for example, a left shoulder blade) to urge the torso to rotate toward the occupant's right side.

A cover 112m of the seat bottom 112a may be structured to stretch to accommodate inflation of the bladders 112c-112e. Also, the configuration of any padding applied to the seat between the bottom 112a and the cover 112m may be adapted to permit the inflatable bladders 112c-112e to expand as described herein. Similarly, a cover 112n of the seat back 112b may be structured to stretch to accommodate inflation of the bladders 112x-112y. Also, the configuration of any padding applied to the seat between the seat back 112b and the cover 112n may be adapted to permit the inflatable bladders 112xc-112y to expand as described herein.

Computing system 114 or a suitable controller (not shown) may be in operative communication with the sensor system 124 and the pressurized fluid source(s) 126, for operating the pressurized fluid source(s) to inflate associated bladder(s) responsive to a location of a portion of the body of the occupant, as detected by the sensor system 124. In one or more arrangements, the computing system 114 may operate as a pressurized fluid source controller by receiving sensor data, determining a location of one or more portions of the occupant's body and controlling the pressurized fluid source(s) responsive to the determined location of the body portion(s). In alternative arrangements, the controller may be a suitable computing device which operates independently of the computing system 114 to control the pressurized fluid source(s).

In one or more arrangements, the portion of the body which an inflatable bladder is positioned to urge in a predetermined direction is also the portion of the body which one or more sensors are configured to detect, for purposes of determining whether to inflate the inflatable bladder. For example, one or more sensors may be configured to detect the position of an occupant's torso. If the torso is determined to lie outside an optimal zone of deployment for an airbag configured to deploy to protect the occupant, a bladder directed to moving the torso into the optimal zone of deployment may be inflated.

Alternatively, the portion of the body which an inflatable bladder is positioned to urge in a predetermined direction may be different from the portion of the body which one or more sensors are configured to detect, for purposes of determining whether to inflate the bladder. For example, one or more sensors may be configured to detect the position of an occupant's head. If the head is determined to lie outside an optimal zone of deployment for an airbag, a bladder directed to moving the torso into the optimal zone of deployment may be inflated, which may also force the head into the optimal zone of deployment.

The computing system 114 or a controller may be configured to operate one or more pressurized fluid sources to inflate one or more the bladders prior to deployment of a vehicle airbag. In one or more arrangements, for example, the vehicle sensors and computing system 114 may continuously monitor the pertinent vehicle occupant parameters of one or more occupants and evaluate the pertinent vehicle occupant parameters of the occupant(s) for purposes of determining whether to inflate one or more bladders.

For example, sensors may indicate that a pertinent portion of the occupant's body lies outside an optimal zone of deployment for an associated airbag. While this condition persists, it may be advisable to inflate one of the bladders to adjust the position of the portion of the occupant's body, prior to deployment of the airbag. If it is deemed desirable to inflate one or more bladders prior to deployment of an associated airbag, a flag relating to the bladder in question may be set to a value indication that the bladder is to be inflated prior to deployment of the airbag.

For example, a pre-collision sensor may signal to the computing system 114 the occurrence of a condition indicating that a collision is imminent. The computing system may then examine the flags relating the bladders. If any of the flags indicate that one or more associated bladder(s) should be inflated prior to inflation of the airbag, the computing system 114 may operate one or more pressurized fluid sources to inflate the designated bladder(s). Inflation of the bladder(s) may act to force one or more portions of the occupant's body back into an optimal zone of airbag deployment. If and when the condition prompting setting of a bladder inflation flag no longer applies, the flag relating to the bladder may be reset to indicate that it is no longer necessary to inflate the bladder prior to deployment of the airbag.

In one or more arrangements, the optimal deployment zone for an airbag may define a volume of space in which it is desirable for the head of the occupant to reside prior to deployment of the airbag. Then, if the occupant's head lies outside the optimal deployment zone, one or more elements of the inflatable occupant positioning system may be activated to reposition the occupant's head by moving the torso in a suitable direction. Alternatively, the optimal deployment zone for an airbag may define a volume of space in which it is desirable for the torso of the occupant to reside prior to deployment of the airbag. Then, if the occupant's torso lies outside the optimal deployment zone, one or more elements of the inflatable occupant positioning system may be activated to reposition the occupant's torso by moving the torso in a suitable direction. However, definition of the optimal deployment zone for a given airbag may be based on criteria other than (or in addition to) the position of the occupant's head or torso.

In order to determine which of bladders 112c-112e and 112x, 112y to inflate, the sensors 124 and computing system 114 may be configured to determine the orientation of a vehicle occupant and/or the relative positions of various portions of the occupant's body. For example, from the position of the occupant's head relative to an optimal zone of deployment of an airbag, a fore-aft axis of the vehicle, the position of the bottom of the seat in which the occupant is seated and/or other information which may be determined from the sensors or which may be calculated by the sensors or the computing system 114 or pre-programmed into a memory, the computing system 114 may determine a direction in which a vehicle occupant is leaning or is turned.

The seat bladders described herein may be structured and positioned so as to urge a portion of the body of an occupant into an optimal deployment zone for a vehicle airbag when one or more of the bladders are inflated. FIGS. 3A-3C are schematic views showing one operational mode of an inflatable occupant positioning system in accordance with an embodiment described herein. Occupant 32 may be seated in a seat 112 similar to the seat shown in FIGS. 2A and 2B. In the example shown in FIGS. 3A-3C, an optimal deployment zone Z1 for a front airbag 301 (FIG. 3C) may be defined and stored in a memory. FIG. 3A shows a frontal view of a seated occupant 32. Occupant 32 has a head 32a and a torso 32b.

In this embodiment, the occupant positioning system may be configured to determine when the head 32a is outside the optimal deployment zone for the airbag 301. Based on this determination and such factors as the position of the head 32a and the orientation of occupant's body, the computing system 114 may determine which bladder (or bladders) need to be inflated to bring the occupant's head back into the optimal deployment zone Z1 prior to deployment of the airbag 301. The necessary bladders may then be flagged by the computing system so that, if the airbag 301 needs to be deployed, the necessary bladder(s) may be inflated to bring the occupant's head back into the zone Z1 prior to airbag deployment.

For example, in the embodiment shown, the occupant is leaning to the right so that the head 32a lies outside the optimal deployment zone Z1 for the airbag 301. This condition may be detected, and the computing system 114 may determine that inflation of the bladder 112e should be performed to bring the occupant's head back into zone Z1 prior to deployment of an associated airbag.

Bladder 112e may be configured to move the occupant's head 32a back into zone Z1 by exerting an upward force on the occupant's right upper thigh region. This may force the torso 32b to rotate in the seat to the occupant's left as shown in FIG. 3B. Rotation of the torso 32b may force the head 32a into the desired zone Z1. FIG. 3B is the schematic view of FIG. 3A showing inflation of the bladder 112e to push the occupant's thigh upwardly, thereby forcing the torso 32b and head 32a to rotate in the direction AA. FIG. 3C is the schematic view of FIG. 3A showing deployment of the airbag 301 after the occupant's head has been repositioned into zone Z1.

When the sensors 124 and computing system determine that the occupant's head 32a is back within the zone Z1 (for example, because the occupant has straightened in his seat), the computing system may adjust the flag associated with the bladder 112e to indicate that this bladder need no longer be inflated prior to deployment of the airbag.

Figure 4B:
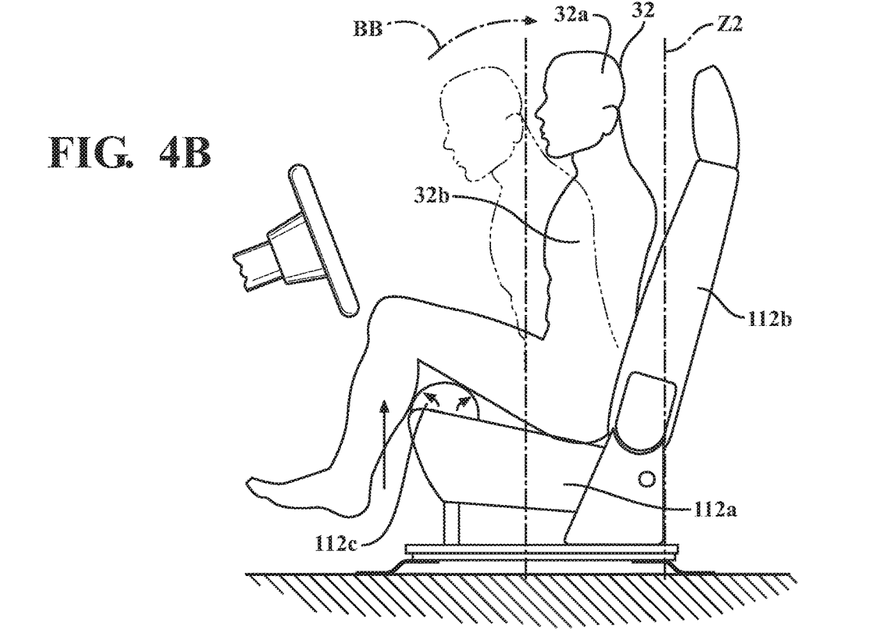
FIG. 4B is the side view of FIG. 4A showing inflation of an inflatable bladder of the inflatable occupant positioning system to urge an out-of-position portion head and torso of the occupant into a position for subsequent deployment of an associated airbag.
Figure 4C:
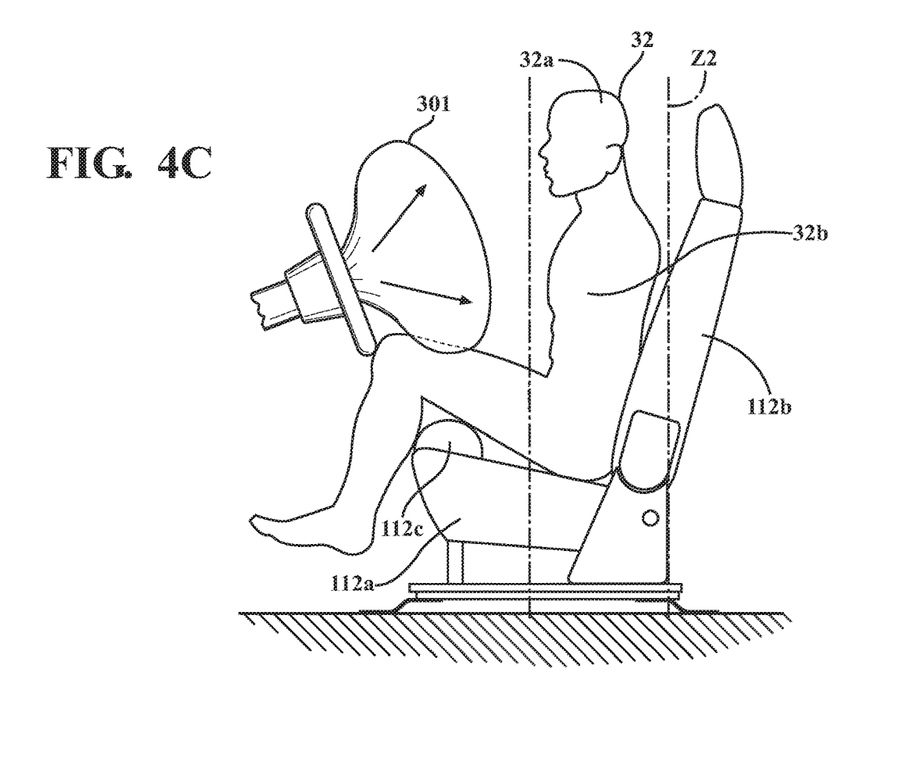
FIG. 4C is the schematic view of FIG. 4B showing the occupant's head and torso repositioned to an optimal location for deployment of the airbag.

FIGS. 4A-4C are schematic views illustrating operation of the inflatable vehicle occupant positioning system when the occupant 32 is leaning forwardly in the seat. In the embodiment shown in FIGS. 4A-4C, the occupant is forward so that the head 32a lies outside the optimal deployment zone Z2 for the airbag 301. This condition may be detected, and the computing system 114 may determine that inflation of the front-most seat bottom bladder 112c should be performed to bring the occupant's head back into zone Z2 prior to deployment of an associated airbag. Bladder 112c may be configured to move the occupant's head 32a back into zone Z2 by exerting an upward force on the occupant's legs just above the knees when inflated, as shown in FIG. 4B. This may force the torso 32b to rotate in the seat to the occupant's rear in direction BB as shown in FIG. 4B. Rotation of the torso 32b may force the head 32a into the desired zone Z2. FIG. 4B is the schematic view of FIG. 4A showing inflation of the bladder 112c to push the occupant's knees upwardly, thereby forcing the torso 32b to rotate in the direction BB. FIG. 4C is the schematic view of FIG. 4A showing deployment of the airbag 301 after the occupant's head 32a has been repositioned into zone Z2. When the sensors 124 and computing system determine that the occupant's head 32a is back within the zone Z2 (for example, because the occupant has straightened in his seat), the computing system may adjust the flag associated with the bladder 112c to indicate that this bladder need no longer be inflated prior to deployment of the airbag.

In other applications, the portion of the body of the occupant which an inflatable bladder is structured and positioned to urge in the predetermined direction is a torso of the occupant. FIGS. 5A-5C show one example of such an application.

FIG. 5A is a schematic plan view of an occupant 32 as previously described seated in seat 112. The occupant 32 is turned or rotated slightly toward his right side. This condition may be detected by the sensors 124 and computing system 114 (for example, by determining the distances of the each of the occupant's shoulders from the seat back 112b). Based on the determination that the occupant 32 is turned while sitting in the seat 112, a flag associated with the seat back right bladder 112x may be set to indicate that this bladder should be inflated to help turn the occupant's torso more toward the front of the vehicle, prior to deployment of the airbag 301.

If a condition arises where deployment of the airbag 301 is deemed to be imminent, and if the occupant's torso 32b is still turned toward the right, bladder 112x may be inflated to urge rotation of the occupant's torso in the direction CC. FIG. 5B shows inflation of the bladder 112x so as to contact the occupant's shoulder or shoulder blade and rotate the torso 32b, prior to deployment of the airbag 301. FIG. 5C shows the occupant 32 in a rotated, forward-facing orientation during deployment of the airbag 301.

When the sensors 124 and computing system 114 determine that the occupant's torso is facing front (for example, because the occupant's shoulders reside at equal distances (within a given tolerance zone) from the seat back 112b), the computing system 114 may adjust the flag associated with the bladder 112x to indicate that this bladder need no longer be inflated prior to deployment of the airbag 301.

Inflatable bladders as described herein may be positioned in any portion of a vehicle seat or in another location within the vehicle, for use in positioning a portion of the occupant's body prior to deployment of an associated airbag. The airbag may be a front airbag, side curtain airbag, or any other type of airbag.

Figure 6:
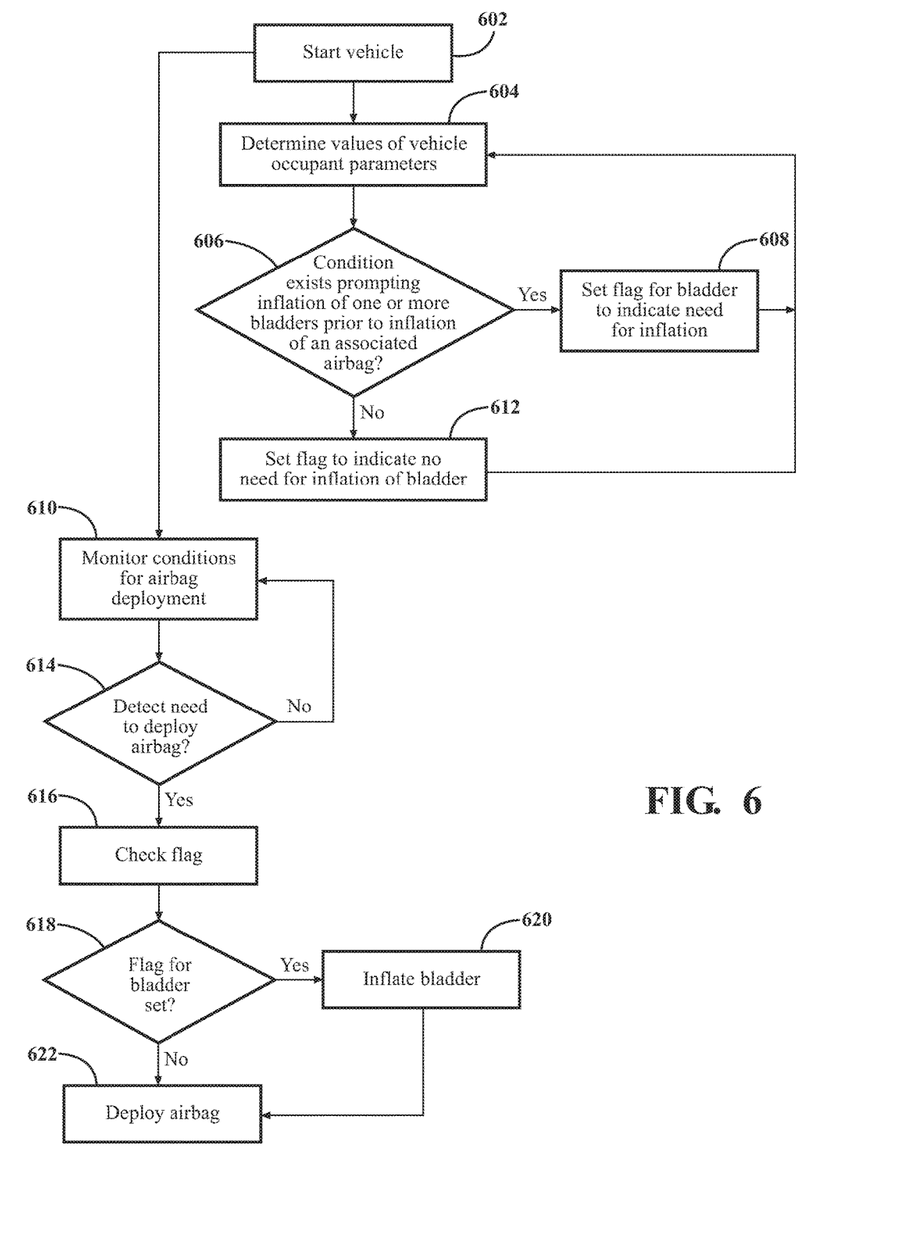
FIG. 6 is a schematic block diagram of a process flow for controlling one or more inflatable bladders of an inflatable occupant positioning system in accordance with various vehicle occupant parameters.

FIG. 6 shows an example of a process flow usable for detecting a vehicle occupant parameter or condition for which inflation of a bladder is advisable to relocate a portion of an occupant's body, prior to airbag deployment. The process flow shown relates to a single bladder. However, the process may be applied for all bladders simultaneously.

In block 602 the occupant's vehicle is started, thereby powering up the sensor system 124 and the computing system 114.

In block 604, various vehicle occupant parameters (such as positions of portions of the occupant's body relative to reference locations in the vehicle, height and weight of the occupant, orientation of the occupant's torso, presence of the occupant's head within an optimal deployment zone for an airbag, etc.) may be detected or determined by the sensors 124 and/or computing system 114. The system may begin detecting and/or determining the vehicle occupant parameters pertinent to inflation of the bladders, for example, whenever the vehicle is turned on or whenever the vehicle is moving. The values or states of these measured vehicle occupant parameters may be compared with reference parameter values (such as threshold values) or states stored in a memory to determine if a condition exists in which it would be desirable to inflate of one or more bladders prior to inflation of an associated airbag. The sensor system 124 and computing system 114 may also (in block 610) monitor external conditions in a known manner for indications that a collision may be imminent.

In block 606, if it is determined that a condition exists prompting inflation of one or more bladders prior to inflation of an associated airbag, flags associated with the bladder(s) may be set in block 608 to indicate the need for bladder inflation prior to airbag deployment.

If it is determined that a condition does not (or no longer) exists prompting inflation of one or more bladders prior to inflation of an associated airbag, the flag associated with a bladder may be set (or reset) in block 612 to indicate that there is no need for inflation of the associated bladder.

If, when monitoring vehicle external conditions, the computing system 114 and/or sensor system 124 (including any pre-collision sensors) determine in block 614 that a collision may be imminent, the computing system may check (in block 616) the flags associated with the various bladders. If (in block 618) the flag for a bladder indicates that the bladder should be inflated prior to airbag deployment, the computing system 114 may (in block 620) operate the pressurized fluid source(s) to inflate the bladder. The computing system 114 may (in block 622) then deploy the airbag. If the flag indicates that the bladder need not be inflated to aid in repositioning the occupant prior to airbag deployment, the computing system 114 may (in block 622) deploy the airbag.

In an alternative embodiment, to conserve power, the elements of the vehicle needed to perform the functions described herein may activate only if and when they are needed. The sensors and elements of the computing system may activate whenever the vehicle is occupied. For example, an occupant may be seated in the driver's seat and the vehicle may be parked along a curb, with the vehicle turned off. Another, moving vehicle may steer off course and impact the parked vehicle. There may be scenarios where sensors would detect an impending impact by another vehicle with the parked vehicle if the sensors were turned on.

If the occupant is not sitting in a seat incorporating inflatable bladders, these positioning elements may not affect the occupant and the pertinent vehicle systems may not be powered up. However, the presence of an occupant in a vehicle seat incorporating inflatable bladders (as detected by a seat sensor, for example) may trigger a flow of power to the vehicle sensors 124, computing system 114 and, if necessary for timely inflation of the bladders, elements of the pressurized fluid sources (such as a compressor). The inflatable vehicle occupant positioning system and supporting systems or elements would then proceed to operate as described herein. This aspect of the inflatable vehicle occupant positioning system may reposition an occupant as described when the vehicle is parked or stopped, thereby helping to increase the effectiveness of the vehicle airbags even when the occupant's vehicle is not moving. This aspect of the inflatable vehicle occupant positioning system may be configured to be turned off by an occupant, if desired, so that the system does not operate when the vehicle is parked. This aspect of the system may be turned off or on using a suitable user interface 99 (FIG. 1).

In the preceding detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The flow diagrams and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle occupant positioning system comprising at least one inflatable bladder mounted in a vehicle seat and arranged so that inflating the at least one inflatable bladder responsive to a determination that a portion of a body of a vehicle occupant lies outside an optimal zone of deployment for an associated airbag causes a portion of the vehicle seat to distend outwardly so as to urge the portion of the occupant's body back into the optimal zone of deployment for the associated airbag, and wherein the at least one inflatable bladder includes at least one first bladder and at least one second bladder, the at least one first bladder arranged to be inflatable so as to move a portion of the seat to lift a first upper thigh of a body of a vehicle seat occupant, the at least one second bladder arranged to be inflatable so as to move a portion of the seat to lift a second upper thigh of the body, the at least one first bladder being inflatable to lift the first upper thigh to a level above the second upper thigh when the at least one second bladder is uninflated, the at least one second bladder being inflatable lift the second upper thigh to a level above the first upper thigh when the at least one first bladder is uninflated.

2. The vehicle occupant positioning system of claim 1, further comprising a pressurized fluid source in operative communication with the at least one inflatable bladder, the pressurized fluid source being arranged to provide inflation fluid to inflate the at least one inflatable bladder.

3. The vehicle occupant positioning system of claim 2, further comprising:
    at least one sensor configured to detect that a current location of the portion of the body of the vehicle occupant lies outside the optimal zone of deployment for the associated airbag; and
    a computing system in operative communication with the at least one sensor and the pressurized fluid source, the computing system being configured to operate the pressurized fluid source to inflate the at least one inflatable bladder responsive to detection that the current location of the portion of the body of the vehicle occupant lies outside the optimal zone of deployment for the associated airbag.

4. The vehicle occupant positioning system of claim 3, wherein the portion of the body of the vehicle occupant the at least one sensor is configured to detect is a head of the occupant.

5. The vehicle occupant positioning system of claim 3, wherein the portion of the body of the vehicle occupant the at least one sensor is configured to detect is a torso of the vehicle occupant.

6. The vehicle occupant positioning system of claim 1 wherein the associated airbag is a front airbag.

7. A vehicle occupant positioning system comprising at least one inflatable bladder mounted in a vehicle seat and arranged so that inflating the at least one inflatable bladder causes a portion of the vehicle seat to distend outwardly so as to urge a torso of a vehicle seat occupant to rotate from a non-forward facing orientation to a forward-facing orientation.

8. A vehicle occupant positioning system comprising at least one inflatable bladder mounted in a vehicle seat and arranged so that inflating the at least one inflatable bladder causes a portion of the vehicle seat to press upwardly on knees of a vehicle seat occupant so as to raise both knees of the seat occupant simultaneously from a first level to a second level higher than the first level.

9. A vehicle occupant positioning system comprising:
    at least one inflatable bladder mounted in a vehicle seat and arranged so that inflating the at least one inflatable bladder causes a portion of the vehicle seat to distend outwardly so as to urge a portion of a body of a vehicle seat occupant in a direction away from the vehicle seat;
    a pressurized fluid source in operative communication with the at least one inflatable bladder, the pressurized fluid source being arranged to provide inflation fluid to inflate the at least one inflatable bladder;
    at least one sensor configured to detect a current location of a portion of a body of a vehicle occupant; and
    a computing system in operative communication with the at least one sensor and the pressurized fluid source, the computing system being configured to operate the pressurized fluid source to inflate the at least one inflatable bladder responsive to the current location of the portion of the body detected by the at least one sensor;
    wherein the computing system is configured to control a flag indicating whether or not the at least one inflatable bladder is to be inflated prior to deployment of an associated vehicle airbag, responsive to the current location of the portion of the body of the vehicle occupant detected by the at least one sensor.

10. The vehicle occupant positioning system of claim 9, wherein the vehicle occupant positioning system is configurable to be operable whenever the vehicle is occupied.

11. The vehicle occupant positioning system of claim 9, wherein the vehicle occupant positioning system is configurable to be operable when the vehicle is turned off.

12. The vehicle occupant positioning system of claim 9, wherein the vehicle occupant positioning system is configurable to be operable when the vehicle is stationary.

* * * * *